United States Patent [19]
Callman

[11] Patent Number: 6,076,815
[45] Date of Patent: Jun. 20, 2000

[54] SEALING DEVICE FOR SPRING SUSPENSION

[75] Inventor: Alf Callman, Lerum, Sweden

[73] Assignee: AB Volvo, Gothenburg, Sweden

[21] Appl. No.: 08/894,631

[22] PCT Filed: May 23, 1995

[86] PCT No.: PCT/SE95/00580

§ 371 Date: Aug. 25, 1997

§ 102(e) Date: Aug. 25, 1997

[87] PCT Pub. No.: WO96/26845

PCT Pub. Date: Sep. 6, 1996

[30] Foreign Application Priority Data

Mar. 2, 1995 [SE] Sweden .................................. 9500767

[51] Int. Cl.$^7$ .................................................. B60G 11/12
[52] U.S. Cl. ............................................ 267/271; 267/268
[58] Field of Search .................................. 267/271, 267, 267/264, 260, 268, 266; 277/560, 551; 384/112, 147, 322, 378, 110, 148; 403/225, 226, 224

[56] References Cited

U.S. PATENT DOCUMENTS

| 1,992,981 | 3/1935 | Zerk | 267/264 |
|---|---|---|---|
| 2,170,455 | 8/1939 | Leighton | 267/267 |
| 2,251,843 | 8/1941 | Jones | 267/264 |
| 2,333,183 | 11/1943 | Jones | 267/267 |
| 4,003,562 | 1/1977 | Kaiser et al. | 267/268 |
| 4,083,545 | 4/1978 | Herbenar | 267/266 |
| 4,103,932 | 8/1978 | Parker | 267/271 |
| 4,166,628 | 9/1979 | Blaydon | 277/560 |
| 5,320,432 | 6/1994 | Fox | 384/110 |

FOREIGN PATENT DOCUMENTS

WO 91/01226  2/1991  WIPO .

*Primary Examiner*—Robert J. Oberleitner
*Assistant Examiner*—Thomas J. Williams
*Attorney, Agent, or Firm*—Young & Thompson

[57] ABSTRACT

A sealed spring suspension for a vehicle includes a threaded bearing made of a spring shackle bolt and a spring bushing; into a recess in either end of the bushing, a sealing ring is pressed, which has a resilient sealing portion with a ring or lip in radial contact with the flat sealing portions of the bolt. By virtue of the bolt thread located between these portions having flattened thread tops and thread bottoms, the ring lip is able to slide without being damaged along said bottoms when the bolt during mounting is threaded into the bushing.

13 Claims, 3 Drawing Sheets

SEALING DEVICE FOR SPRING SUSPENSION

BACKGROUND OF THE INVENTION

The invention relates to a sealed spring suspension for a vehicle, said spring suspension comprising a spring shackle bolt which is threaded in a spring bushing of a leaf spring and which is non-rotatably mounted in a mounting on the frame of the vehicle, the spring bushing being rotatable about the bolt depending on resilient movements of the spring supported by means of the bushing.

DESCRIPTION OF RELATED ART

Devices of the above mentioned type are previously known for suspension of a leaf spring in a spring anchorage and a spring shackle in a truck. Since each spring bushing during the resilient movements is rotated about the respective bolt up to 10°, the bushing and the bolt form together a threaded bearing lubricated with grease. In order to make the load-absorbing surface greater, the bearing surfaces are threaded in both the bushing and the bolt. This provides axial guidance between the parts as well.

Due to the fact that the spring suspension is placed so as to be subjected to dirt and water, and due to the relatively high load on the bearing surfaces, regular lubrication is required, which is made possible by means of a lubricating nipple arranged in each spring shackle bolt. For lubrication, grease is pressed out through two holes in the middle of the bolt forcing itself between the threads so that any water and dirt is pushed out and drained out at the end portions of the bolt. This has, however, proved insufficient for protecting the threads against corrosion and jamming.

According to a known solution, a first O-ring is therefore applied against a shoulder at one end of the bolt, and after inserting the bolt through the anchorage and the bushing, a second O-ring is applied to the other end of the bolt. When the bolt is tightened, the O-rings are compressed axially, the first between the shoulder of the bolt and the bushing, and the second between the sleeve and the spring bracket of the anchorage. An important precondition for achieving a satisfactory seal in the two O-rings is that the bushing be correctly mounted in the bracket with an equal gap at both ends, and this makes the mounting time-consuming, complicated and thus costly.

SUMMARY OF THE INVENTION

The purpose of the present invention is therefore to achieve in a simple manner a reliable spring suspension, which is easily assembled in a shorter period of time than previously and which has a more reliable seal than previous designs and which avoids improper installation.

This is achieved according to the invention by virtue of the fact that the bushing in each end portion is equipped with a seal which is in continuous sealing contact with the bolt regardless of the axial position of the bushing relative to the bolt and the anchorage. Advantageous improvements and further developments of the invention are disclosed in the subclaims.

BRIEF DESCRIPTION OF THE DRAWINGS

The invention will be described in more detail below with reference to the accompanying drawing.

DESCRIPTION OF THE PREFERRED EMBODIMENTS

Figure 1:
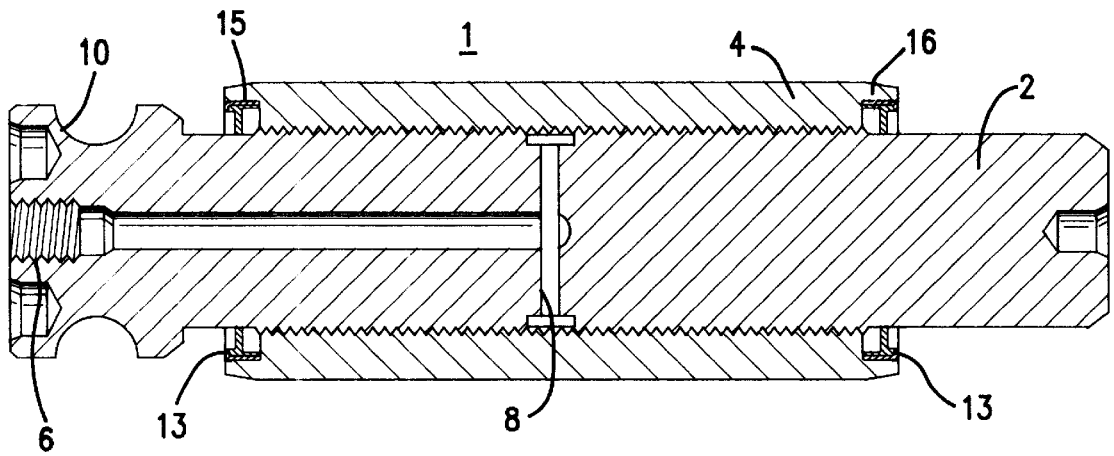
FIG. 1 shows a device according to the invention longitudinal section with a spring shackle bolt screwed into a spring bushing provided with lip seals.

A grease-threaded bearing 1 for a vehicle spring suspension consists of a spring shackle bolt 2 and a spring bushing 4. The bolt 2 is a conventional design, which means that it is threaded and screwed for mounting into the corresponding thread of the bushing 4, which is in turn pressed into a spring hole in one end of the leaf spring package in question. The bolt 2 is then anchored in a known manner by means of two stop screws in the spring anchorage or spring shackle (not shown) or after a similar threaded bearing is mounted in the other end of the spring package.

In the center of the spring bolt, there is arranged a lubricating channel 6, which can be filled with grease via a lubricating nipple (not shown) mounted at the inlet of the channel.

In the middle of the bolt 2, the channel 6 bifurcates into two branches 8, each having an opening to the threaded lateral surface of the bolt. It is thereby possible, in a known manner, to force grease between the threaded contact surfaces of the bolt and the bushing. Each end of the bolt has a groove for receiving the respective stop-screw when the bolt 2 is completely screwed into the bushing 4. These grooves are shown in the drawing and have the reference numerals 9 and 10. The groove 10 is annular, running circumferentially in the lateral surface of the head end of the bolt. Two straight opposing grooves 9, 9' are made in the lateral surface at the other end of the bolt. The thread of the bolt 2 is made in a manner that its thread top 11 and thread bottom 12 have flat surfaces, as do the corresponding threads in the bushing 4, so that grease can creep out between the threads from the annular gap.

A sealing ring 13 is pressed into a recess 14 cut concentrically into each end 15,16 of the bushing. The recess 14 is limited axially by a surface 18 against which the sealing ring 13 abuts with one side. The sealing ring has a rigid anchoring portion and a resilient sealing portion. The anchoring portion consists of an annular jacket 20 of metal in which the sealing portion is fixed, e.g. by adhesive. The jacket 20 has at one end a bent-in flange 21, which is also annular.

The sealing portion has a ring lip 22, which is integral with and extends radially inwards from a rubber ring 24, the outer cylindrical circumference of which is the surface fixed to the anchoring portion. The rubber ring 24 has as well inner circumferential surfaces of different diameters on either side of the ring lip 22. The side of the rubber ring 24 facing away from the ring flange 21 thus has a greater inner diameter than the side facing the flange 21, the inner diameter of which being equal to the inner diameter of said flange 21. The lip 22 forms, when unloaded, a substantially right angle with the peripheral surfaces of the rubber ring 24 and has an inner diameter $Td_i$ which is somewhat less, suitably 1.1 mm less, than the bottom diameter $Bd_i$ of the thread of the bolt 2.

The length of lip 22 may be less than the distance between two immediate adjacent thread tops 11.

Figure 2:
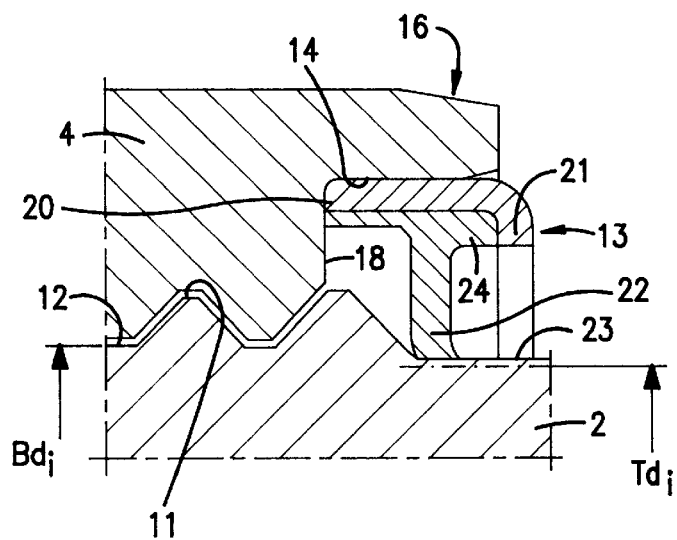
FIG. 2 shows a detail of the device shown in FIG. 1 on a larger scale.
Figure 3:
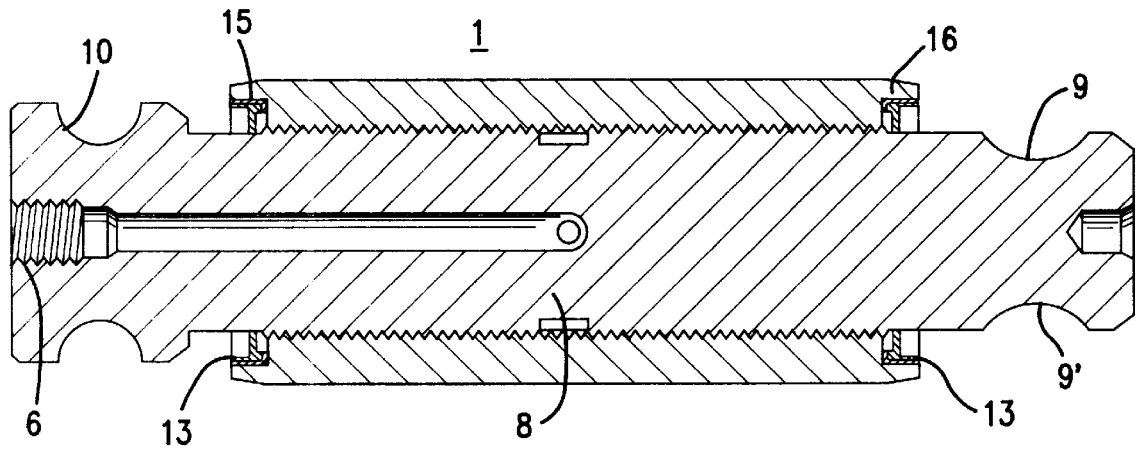
FIG. 3 is a view of the device according to FIG. 1 in longitudinal section but which is rotated 90° about the longitudinal axis and has oppositely facing seals.

According to one example, the sealing ring 13 is mounted in the recess 14 in such a manner that the flange 21 is turned away from the surface 18 (FIG. 2).

Figure 4:
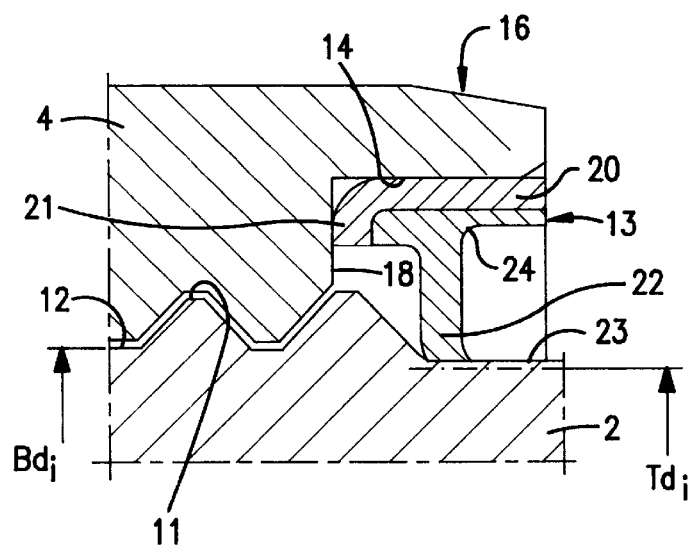
FIG. 4 shows a detail of this alternative mounting of the lip seals in the device according to FIG. 3 on a larger scale.

A preferred embodiment is shown in FIG. 4, where the sealing ring 13 has the reversed mounting in the recess with the ring flange 21 in contact with the surface 18. The recess 14 is made with a death corresponding to the total axial extent of the sealing ring, which means that the surface 18 is located at the same distance from the end of the bushing. The outwardly facing side of the sealing ring is thus level with the end surface of the bushing. It is thereby possible to adjust the bushing 4 when mounting it in the spring eye or hole in the spring package by means of hammering the end surface of the bushing without damaging the sealing ring 13. At the same time, mounting of the sealing rings in the bushing 4 is also facilitated, with the aid of a hammer for example, since each sealing ring is correctly mounted when its outer surface is level with the end surface of the bushing and can thus not be deformed by being hammered in too far.

When the bolt 2 during mounting is threaded into the bushing 4, the ring lip 22 will slice along the thread bottom 12 between the thread tops 11 to the position shown in FIG. 2, in which the bolt is completely screwed into the bushing and the two ring lips 22 seal radially against the intended flat sealing portions 23 on the bolt. By virtue of the fact that the bottoms 12 and the tops 11 of the thread are flat, the ring lip 22 will not be damaged, and furthermore a greater space will be created in the thread profile to be filled with grease.

Figure 5:
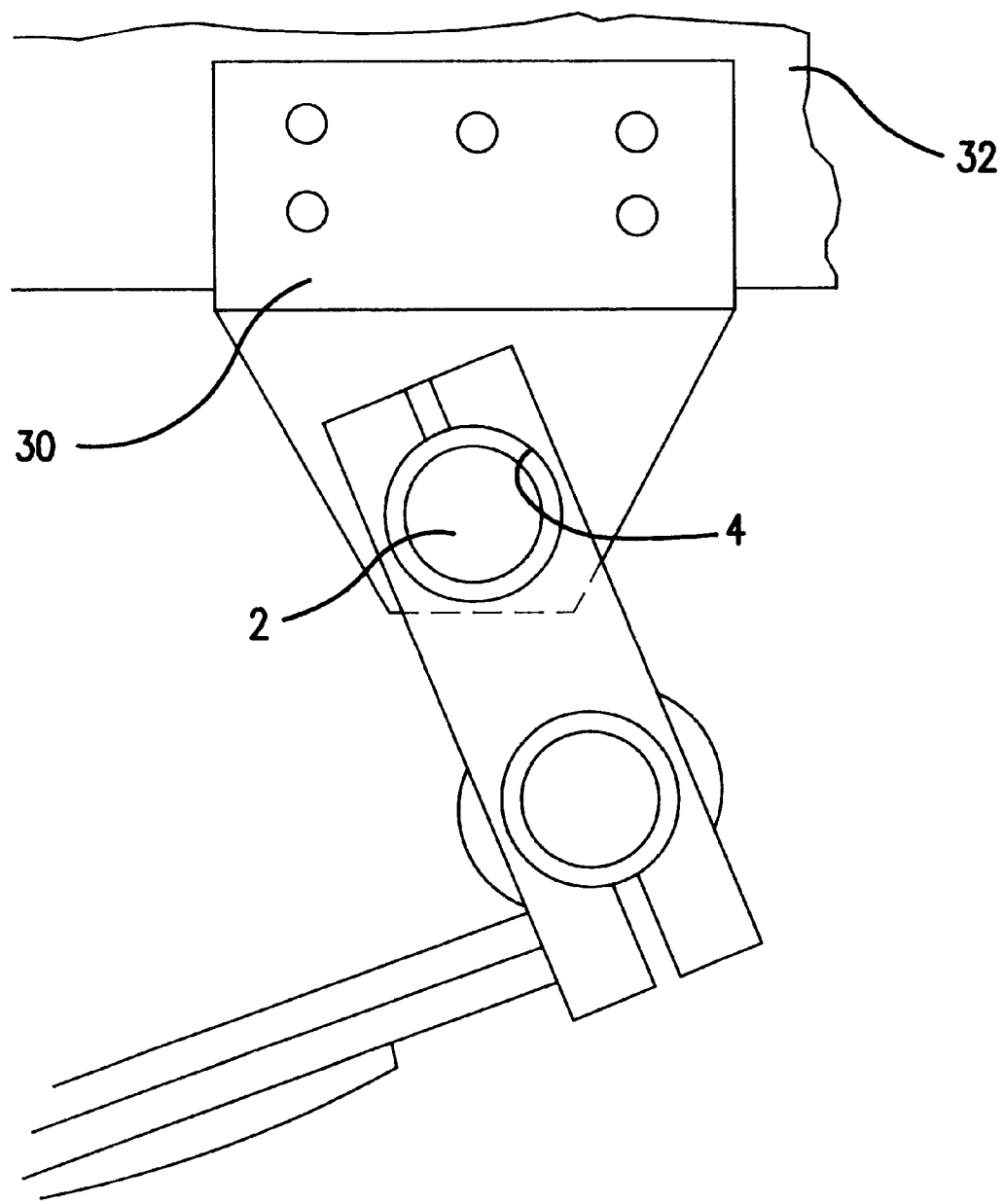
FIG. 5 shows a partial view of a spring suspension with the spring shackle bolt within the spring bushing rotatably mounted in an anchorage of a vehicle frame.

FIG. 5 shows a partial view of a spring suspension with the spring shackle bolt within the spring bushing 4 non-rotatably mounted in an anchorage of a vehicle frame 32.

I claim:

1. Sealed spring suspension for a vehicle, said spring suspension comprising:
    a threaded spring shackle bolt (2) non-rotatably mounted in an anchorage in the frame of the vehicle and threaded in a spring bushing (4) of a leaf spring,
    the spring bushing being rotatable about the bolt depending on resilient movements of the spring supported by means of the bushing,
    the bushing (4) in each end portion (16) being equipped with a radially inwards extending seal (13) secured to the bushing, which seal is formed to be in continuous sealing contact with the bolt (2) regardless of the axial position of the bushing (4) relative to the bolt (2) and the anchorages,
    wherein the seal (13) is annular and has a radially inwardly extending part (22) with a length less than the distance between two immediate adjacent thread tops.

2. Device according to claim 1, wherein the seal (13) is in contact with a non-threaded portion (23) of the bolt (2) when the bolt is mounted in the spring bushing.

3. Device according to claim 1, wherein at least the thread of the bolt (2) has flattened thread tops (11).

4. Device according to claim 1, wherein the seal (13) has a seal lip (22), the inner diameter (Td$_i$) of which is less than the bottom diameter (Bd$_i$) of the bolt thread.

5. Device according to claim 1, wherein the seal (13) is made of metal and rubber.

6. Device according to claim 1, wherein the seal (13) is made of metal and plastic.

7. Device according to claim 1, wherein the distance between the end surface of the bushing (4) and a surface (18) of a recess (14) in the bushing is at least as great as the axial extent of the seal (13).

8. Device according to claim 7, wherein the seal (13) has a jacket (20) of metal, which jacket has a ring flange (21) on one side, the ring flange abutting against the surface (18) when the seal is mounted in the recess (14).

9. Device according to claim 1, wherein the spring bolt (2) adjacent its two ends has grooves (9,10) to receive individual stop screws.

10. A spring shackle bolt and spring bushing for non-rotatable mounting in a vehicle suspension anchorage, comprising:
    a spring bushing with a first recess and a second recess located respectively in first and second end portions of said spring bushing, and a threaded interior surface extending from said first recess to said second recess;
    said threaded interior surface having substantially triangular-shaped bushing threads wherein tops of said bushing threads and a joining point between two adjacent bushing threads include a flat surface aligned with an axis of said spring bushing;
    a spring shackle bolt with a threaded outer surface corresponding to said threaded interior surface and adapted to thread said spring shackle bolt into said spring bushing, and a non-threaded first end portion and a non-threaded second end portion, which when said spring shackle bolt is threaded into said spring bushing, align with said first and second end portions;
    said threaded outer surface having substantially triangular-shaped bolt threads wherein tops of said bolt threads and a joining point between two adjacent bolt threads include a flat surface aligned with an axis of said spring shackle bolt;
    said bushing threads and said bolt threads being dimensioned to provide a lubricant channel therebetween; and
    T-shaped sealing rings pressed into each of said first recess and said second recess, each of said sealing rings comprising a rigid anchoring portion aligned with the axis of said spring bushing and a resilient sealing portion perpendicular to the axis of said spring bushing, the resilient sealing portion formed to be in continuous sealing contact with one of said non-threaded first end portion and said non-threaded second end portion regardless of the axial position of said spring bushing relative to said spring shackle bolt and with a length less than the distance between two immediate adjacent thread tops.

11. A spring shackle bolt and spring bushing for non-rotatable mounting in a vehicle suspension anchorage of claim 10, wherein said sealing rings further comprise:
    a flange attaching said rigid portion to said recess, said flange including a bent-in portion at one end;
    and said rigid portion comprises a first thicker part adjacent said bent-in portion and a second thin part opposite said bent-in portion.

12. A spring shackle bolt and spring bushing for non-rotatable mounting in a vehicle suspension anchorage of claim 11, wherein said bent-in portion extends beyond an end surface of said spring bushing.

13. A spring shackle bolt and spring bushing for non-rotatable mounting in a vehicle suspension anchorage of claim 4, wherein said bent-in portion abuts an interior surface of said recess and an end of said flange opposite said bent-in portion is aligned with an end surface of said spring bushing.

* * * * *